(12) United States Patent
Yan et al.

(10) Patent No.: US 11,702,007 B2
(45) Date of Patent: *Jul. 18, 2023

(54) SYSTEM AND METHOD FOR VEHICLE IMAGE COLLECTION

(71) Applicant: Beijing Tusen Zhitu Technology Co., Ltd., Beijing (CN)

(72) Inventors: Chao Yan, Beijing (CN); Ming Wang, Beijing (CN); Jie Sun, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,201

(22) Filed: Oct. 25, 2021

(65) Prior Publication Data
US 2022/0041104 A1 Feb. 10, 2022

Related U.S. Application Data

(63) Continuation of application No. 16/250,549, filed on Jan. 17, 2019, now Pat. No. 11,155,207.

(30) Foreign Application Priority Data

Nov. 24, 2017 (CN) .......................... 201711193190.3

(51) Int. Cl.
*B60R 1/00* (2022.01)
*H04N 7/18* (2006.01)
(Continued)

(52) U.S. Cl.
CPC ................ *B60R 1/00* (2013.01); *B60R 11/04* (2013.01); *H04N 7/181* (2013.01); *H04N 7/183* (2013.01);
(Continued)

(58) Field of Classification Search
None
See application file for complete search history.

(56) References Cited

U.S. PATENT DOCUMENTS 6,642,955 B1 11/2003 Midgley
9,143,670 B1 9/2015 Cilia et al.
(Continued)

FOREIGN PATENT DOCUMENTS

CN 1615640 A 5/2005
CN 102273201 A 12/2011
(Continued)

OTHER PUBLICATIONS

No Author. Chinese Application No. 201711193190.3, First Search Report dated Apr. 17, 2019, p. 1.
(Continued)

*Primary Examiner* — Mohammed Jebari
(74) *Attorney, Agent, or Firm* — Paul Liu; Julie J. Muyco; Perkins Coie, LLP

(57) ABSTRACT

The present document describes a vehicle-side image capturing system and method that is capable of improving qualities of images captured at vehicle-side. The system includes: a controller, a plurality of cameras, a light sensor and an encoder each connected to the controller. The controller is configured to: receive an illumination intensity of a current environment from the light sensor, select one of the plurality of cameras that is adapted to the illumination intensity as a target camera, activate when the target camera is different from a currently operating camera, deactivate the currently operating camera then configure the target camera as an operating camera for image capturing, and receive images captured by the operating camera and transmit the
(Continued)

received images to the encoder. The encoder is configured to encode the received images and transmit the encoded images.

20 Claims, 6 Drawing Sheets

(51) Int. Cl.
*B60R 11/04* (2006.01)
*H04N 5/232* (2006.01)
(52) U.S. Cl.
CPC ........ *B60R 2300/105* (2013.01); *H04N 5/232* (2013.01); *H04N 5/23222* (2013.01)

(56) References Cited

U.S. PATENT DOCUMENTS

| | | |
|---|---|---|
| 2002/0003571 A1 | 1/2002 | Schofield |
| 2003/0093805 A1 | 5/2003 | Gin |
| 2007/0180482 A1 | 8/2007 | Frink |
| 2008/0012940 A1* | 1/2008 | Kanaoka ................ H04N 5/272 348/148 |
| 2011/0157364 A1 | 6/2011 | Lee |
| 2011/0199482 A1 | 8/2011 | Morgan |
| 2014/0361986 A1 | 12/2014 | Won |
| 2015/0156427 A1 | 6/2015 | Wagner |
| 2016/0360088 A1 | 12/2016 | Tanabiki |
| 2018/0191940 A1 | 7/2018 | Wu |

FOREIGN PATENT DOCUMENTS

| | | | |
|---|---|---|---|
| CN | 102480593 A | | 5/2012 |
| CN | 104994352 A | | 10/2015 |
| CN | 105100648 A | | 11/2015 |
| CN | 107135386 A | | 9/2017 |
| CN | 107835370 A | * | 3/2018 |
| CN | 209283361 U | | 8/2019 |
| JP | 2004247895 A | * | 9/2004 |
| WO | 2017059991 A1 | | 4/2017 |

OTHER PUBLICATIONS

No Author. Chinese Application No. 201711193190.3, First Office Action dated Apr. 25, 2019.
No Author. Chinese Application No. 201711193190.3, Second Office Action dated Jan. 10, 2020.
No Author. Chinese Application No. 2021105189440.8, First Office Action dated Jun. 21, 2022, pp. 1-15.
English translation of office action from corresponding Chinese Patent Application No. 202110518944.8, dated Feb. 17, 2023 (20 pages).

* cited by examiner

SYSTEM AND METHOD FOR VEHICLE IMAGE COLLECTION

PRIORITY CLAIM AND RELATED APPLICATIONS

This patent document is a continuation of and claims benefit of priority to U.S. application Ser. No. 16/250,549 filed Jan. 17, 2019 which claims priority to and benefits of Chinese Patent Application No. 201711193190.3 filed Nov. 24, 2017. The entire contents of the before-mentioned patent applications are incorporated by reference as part of the disclosure of this document.

TECHNICAL FIELD

The present disclosure relates to autonomous driving technology, and more particularly, to a vehicle side image capturing system and a vehicle side image capturing method.

BACKGROUND

Currently, there are more and more applications of vehicle-mounted sensors all over the world. Applications of cameras are especially becoming more and more popular. For example, in the field of autonomous driving, images are captured by vehicle-mounted cameras while a vehicle is operate to record information on the environment around the vehicle to safely control the self-driving vehicle. That is, the vehicle-mounted cameras are required to capture high-quality images with high reliability.

SUMMARY

In a first aspect, according to an embodiment of the present disclosure, a vehicle side image capturing system is provided. The system includes a controller and a plurality of cameras, a light sensor and an encoder each connected to the controller. The controller is configured to: receive an illumination intensity of a current environment from the light sensor. The controller is also configured to select one of the plurality of cameras that is adapted to the illumination intensity as a target camera. The controller is also configured to activate, when the target camera is different from a currently operating camera, the target camera and deactivate the currently operating camera, and configure the target camera as an operating camera for image capturing. The controller is also configured to receive an image captured by the operating camera and transmit the received image to the encoder. The encoder is configured to encode the received image and transmit the encoded image.

In a second aspect, according to an embodiment of the present disclosure, a vehicle side image capturing method is provided. The method includes: obtaining an illumination intensity of a current environment. The method is also includes selecting one of a plurality of cameras that is adapted to the illumination intensity as a target camera. The method is also includes activating, when the target camera is different from a currently operating camera, the target camera and deactivating the currently operating camera, and configuring the target camera as an operating camera for image capturing. The method is also includes encoding an image captured by the operating camera and transmitting the encoded image.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

Figure 1:
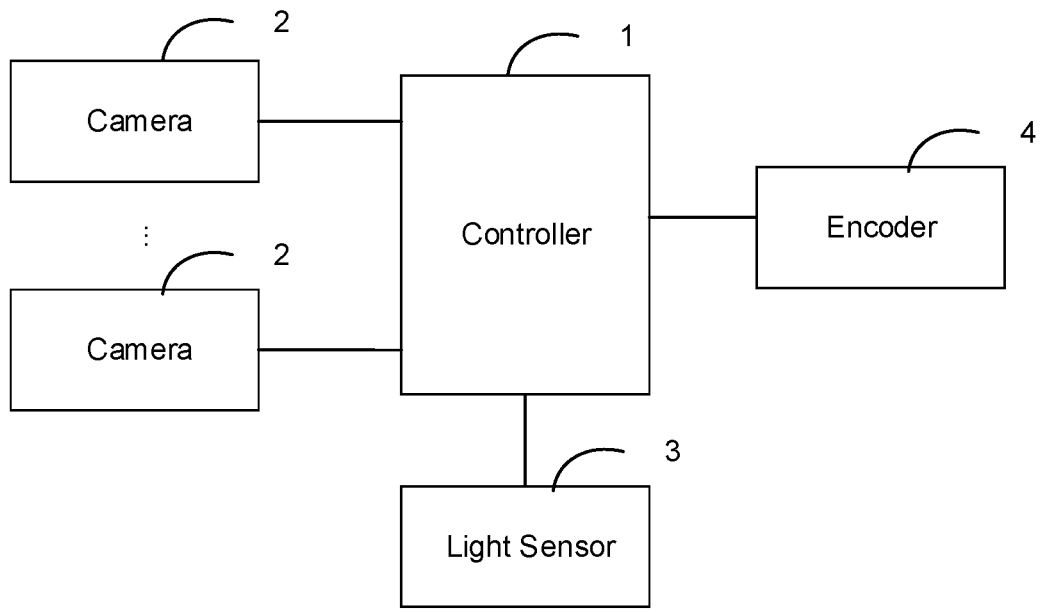
FIG. 1 is a schematic diagram showing a structure of a vehicle side image capturing system according to some embodiments of the present disclosure.

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In the related art, changes in the environment result in constantly changing illumination intensity. For example, the illumination intensity could be very different under the influence of daylight, night, tunnels, culverts and bridge holes, which in turn causes a focal length of a camera lens to vary significantly. If a fixed-focus lens is used to capture images at different illumination intensities, the qualities of the captured image would be quite different. For example, if the fixed-focus lens is adapted to the illumination intensity during daytime, it may only capture low-quality images at night. Similarly, if the fixed-focus lens is adapted to the illumination intensity at night, it may only capture low-quality images during daytime.

How to enable vehicle-mounted cameras to capture high-quality images in different environments with largely different illumination intensities has become a technical problem that needs to be solved in the field of autonomous driving.

In view of the above problem, the present disclosure provides a vehicle side image capturing system and a vehicle side image capturing method, capable of improving qualities of images captured at the vehicle side.

The vehicle side image capturing system according to the present disclosure includes a controller, a plurality of cameras and a light sensor. The light sensor is configured to monitor an illumination intensity of a current environment in real time. The controller is configured to select one of the plurality of cameras that is adapted to the illumination intensity of the current environment as a target camera and configure the target camera as an operating camera for image capturing. With the solutions according to the present disclosure, on one hand, it is possible to flexibly switch to a cameras that is adapted to the illumination intensity of the current environment for image capturing based on the illumination intensity of the current environment, such that the vehicle-mounted cameras may capture high-quality images in different environments with largely different illumination intensities. On the other hand, the controller may switch the cameras by means of electronic control or software handover, which will not be affected by vibrations that occur while the vehicle is running. The switching of the cameras may have a high success rate and may be highly reliable and suitable for the vehicle side when the vehicle is running.

Embodiment 1

Referring to FIG. 1, which is a schematic diagram showing a structure of a vehicle side image capturing system according to an embodiment of the present disclosure, the system may include a controller 1 and a plurality of cameras 2, a light sensor 3 and an encoder 4 each connected to the controller 1.

The controller 1 may be configured to: receive an illumination intensity of a current environment from the light sensor 3; select one of the plurality of cameras 2 that is adapted to the illumination intensity as a target camera; activate, when the target camera is different from a currently operating camera, the target camera and deactivate the currently operating camera, and configure the target camera as an operating camera for image capturing; and receive an image captured by the operating camera and transmit the received image to the encoder.

The encoder 4 may be configured to encode the received image and transmit the encoded image.

In embodiments of the present disclosure, when the target camera is the same as the currently operating camera, the controller 1 may do not need to switch the cameras and may continue using the currently operating camera for image capturing.

In some embodiments, the light sensor 3 may measure the illumination intensity of the environment in which the vehicle is currently located in real time or periodically.

In some embodiments of the present disclosure, in order to avoid image capturing failure while the controller 1 is switching the cameras, upon determining to switch from the currently operating camera to the target camera, the controller 1 may activate the target camera and establish a video link between the controller and the target camera. The currently operating camera may continue capturing images before the video link between the controller and the target camera is successfully established. When the video link between the controller and the target camera has been successfully established, the currently operating camera may be deactivated and the target camera may be configured as the operating camera for image capturing.

In particular, the controller 1 may activate the target camera and deactivate the currently operating camera by: activating the target camera and establishing a video link between the controller 1 and the target camera; and deactivating the currently operating camera when the video link between the controller 1 and the target camera has been established successfully.

In some cases, the selected target camera may malfunction and be unusable. In some embodiments of the present disclosure, the controller 1 may start a timer upon activating the target camera and, if the video link between the controller and the target camera has not been established successfully when the timer has been running for a period of time, the controller may deactivate the target camera and continue using the currently operating camera for image capturing, so as to ensure that images may be captured successfully. Thus, the controller 1 may be further configured to: start a timer upon activating the target camera; and deactivate the target camera if the video link between the controller and the target camera has not been established successfully when the timer reaches a predetermined time length threshold.

In embodiments of the present disclosure, if the controller 1 has failed in establishing the video link with the target camera before the timer reaches the time length threshold, it may reestablish the video link with the target camera. If the video link with the target camera has not been established successfully when the timer reaches the predetermined time length threshold, the target camera may be deactivated. Of course, those skilled in the art may adopt alternative schemes. For example, the controller 1 may establish a video link between the controller and the target camera upon activating the target camera. If the video link is successfully established, the controller 1 may deactivate the currently operating camera. If the controller 1 fails to establish the video link, it may increment a counter by 1 (the counter has an initial value of 0) and reestablish the video link between the controller and the target camera. If the video link is successfully established, the controller 1 may deactivate the currently operating camera; otherwise it may further increment the counter by 1, and so on. When the counter reaches a predetermined threshold value, the controller 1 may deactivate the target camera.

In embodiments of the present disclosure, among the plurality of cameras connected to the camera, only the one acting as the operating camera may be active for capturing images, while the others may be in inactive states.

In an example, the controller 1 may record states (including active and inactive states) of all the cameras 2 connected to the controller 1. The controller 1 may modify a state of a camera into the active state when the camera is activated, and into the inactive state when the camera is deactivated. When the controller 1 has determined the target camera, it may read the state of the target camera. If the state of the target camera is the active state, the controller 1 may determine that the target camera is the same as the currently operating camera. If the state of the target camera is the inactive state, the controller 1 may determine that the target camera is different from the currently operating camera, activate the target camera, deactivate the currently operating camera when the video link between the controller and the target camera has been successfully established, modify the state of the currently operating camera into the inactive state and modify the state of the target camera into the active state. The active and inactive states may be represented by numbers or characters. For example, the active state may be represented by "1" and the inactive state may be represented by "0". Alternatively, the active state may be represented by "Y" and the inactive state may be represented by "N". The present disclosure is not limited to any specific representations.

In another example, the controller 1 may record identifications of all the cameras 2 connected to the controller 1 (including operating and non-operating camera identifications). When the controller 1 has determined the target camera, it may read the identification of the target camera. If the identification of the target camera is the operating camera identification, the controller 1 may determine that the target camera is the same as the currently operating camera. If the identification of the target camera is the non-operating camera identification, the controller 1 may determine that the target camera is different from the currently operating camera, activate the target camera, deactivate the currently operating camera when the video link between the controller and the target camera has been successfully established, modify the identification of the currently operating camera into the non-operating camera identification and modify the identification of the target camera into the operating camera identification. The identifications may be represented by numbers or characters. For example, the operating camera identification may be represented by "1" and the non-operating camera identification may be represented by "0". Alternatively, the operating camera identification may be represented by "Y" and the non-operating camera identification may be represented by "N". The present disclosure is not limited to any specific representations.

In an example, a correspondence between the respective cameras connected to the controller 1 and respective illumination intensity ranges of may be pre-stored in the controller 1. When the controller 1 receives the illumination intensity of the current environment, it may match the illumination intensity with the illumination intensity ranges in the pre-stored correspondence and determine the camera corresponding to the matched illumination intensity range as the target camera.

In some embodiments of the present disclosure, the plurality of cameras connected to the controller 1 may correspond to different ranges of illumination intensity values. The focal length of the lens of each of the cameras may be adjusted according to its corresponding range of illumination intensity values.

The plurality of cameras may have same or different models. In order for adaptation to different illumination intensities, in embodiments of the present disclosure, different models of cameras may correspond to different illumination intensity ranges. For a camera corresponding to a high illumination intensity, its photosensitive device and image signal processor may be devices adapted to the high illumination intensity, e.g., the photosensitive device may be an OV10640 chip and the image signal processor may be an OV490 chip. For a camera corresponding to a low illumination intensity, its photosensitive device and image signal processor may be devices adapted to the low illumination intensity, e.g., the photosensitive device may be an IMX224 chip and the image signal processor may be a CXD5700 chip.

In some embodiments of the present disclosure, the number of cameras connected to the controller may be set flexibly depending on actual requirements. The number may be two or three and the present disclosure is not limited to any specific number.

In order to facilitate understanding of the solutions according to the present disclosure by those skilled in the art, the solutions is described in detail below with reference to an example where two cameras are connected to the controller 1. The same principle applies to any other number of cameras and details thereof is omitted here.

Figure 2:
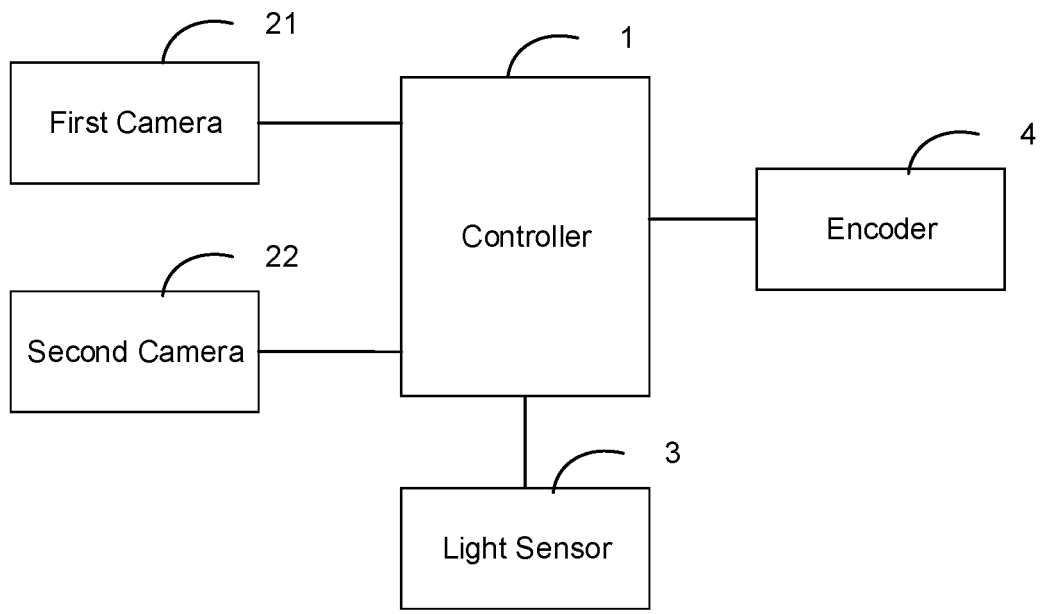
FIG. 2 is another schematic diagram showing a structure of a vehicle side image capturing system according to some embodiments of the present disclosure.

As shown in FIG. 2, a first camera 21 adapted to an illumination intensity higher than or equal to a predetermined illumination intensity threshold and a second camera 22 adapted to an illumination intensity lower than the illumination intensity threshold are connected to the controller 1. The controller 1 may receive the illumination intensity of the current environment from the light sensor 3, determine whether the illumination intensity is higher than or equal to the predetermined illumination intensity threshold and, if so, select the first camera 21 as the target camera; or otherwise select the second camera 22 as the target camera. The controller 1 may determine whether the selected target camera is the currently operating camera and, if so, do nothing but continue capturing images using the currently operating camera; or otherwise may activate the target camera, establish a video link between the controller 1 and the target camera, deactivate the currently operating camera after the video link between the controller 1 and the target camera has been successfully established, and configure the target camera as an operating camera for image capturing.

Figure 3:
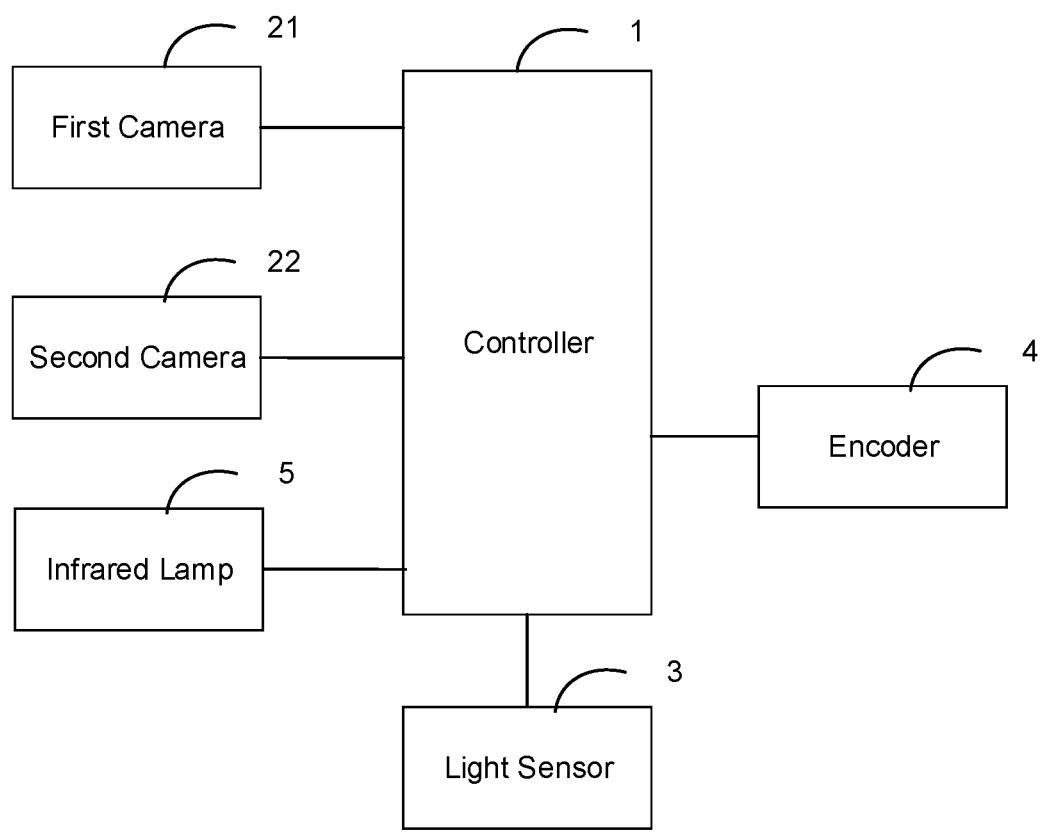
FIG. 3 is another schematic diagram showing a structure of a vehicle side image capturing system according to some embodiments of the present disclosure.

In some embodiments, in order to further improve the quality of images captured by the second camera 22, the system shown in FIG. 2 further includes an infrared lamp 5 connected to the controller 1, as shown in FIG. 3. When the second camera 22 acts as the operating camera for image capturing, the infrared lamp 5 may be activated for providing the second camera 22 with supplementary light. The infrared lamp 5 may be deactivated when the second camera 22 is deactivated. Therefore, when the currently operating camera is the first camera 21 and the target camera is the second camera 22, the controller 1 may be further configured to activate the infrared lamp 5 before activating the second camera 22. When the currently operating camera is the second camera 22 and the target camera is the first camera 21, the controller 1 may be further configured to deactivate the infrared lamp 5 after deactivating the second camera 22.

In an example, assuming that the currently operating camera is the first camera 21, when the controller receives the illumination intensity of the current environment as transmitted from the light sensor 3 and determines that the illumination intensity is lower than the illumination intensity threshold (which may be set flexibly as appropriate, e.g., to 0.3 lux, the present disclosure is not limited to any specific value of the illumination intensity threshold), it may select the second camera 22 as the target camera, activate the second camera 22 and the infrared lamp 5, establish a video link between the controller 1 and the second camera 22, deactivate the first camera 21 when the video link has been successfully established, and configure the second camera 22 as an operating camera for image capturing. The controller 1 may continue to receive the illumination intensity of the current environment as transmitted from the light sensor 3 and, when determining that the illumination intensity is higher than the illumination intensity threshold, may select the first camera 21 as the target camera, activate the first camera 21, establish a video link between the controller 1 and the first camera 21, deactivate the second camera 22 and the infrared lamp 5 when the video link has been successfully established, and configure the first camera 21 as an operating camera for image capturing.

In some embodiments, in order to further improve the quality of images captured by the first camera 21 and the second camera 22, a photosensitive device and an image signal processor in the first camera 21 may be devices adapted to a high illumination intensity and a photosensitive device and an image signal processor in the second camera 22 may be devices adapted to a low illumination intensity.

Figure 4:
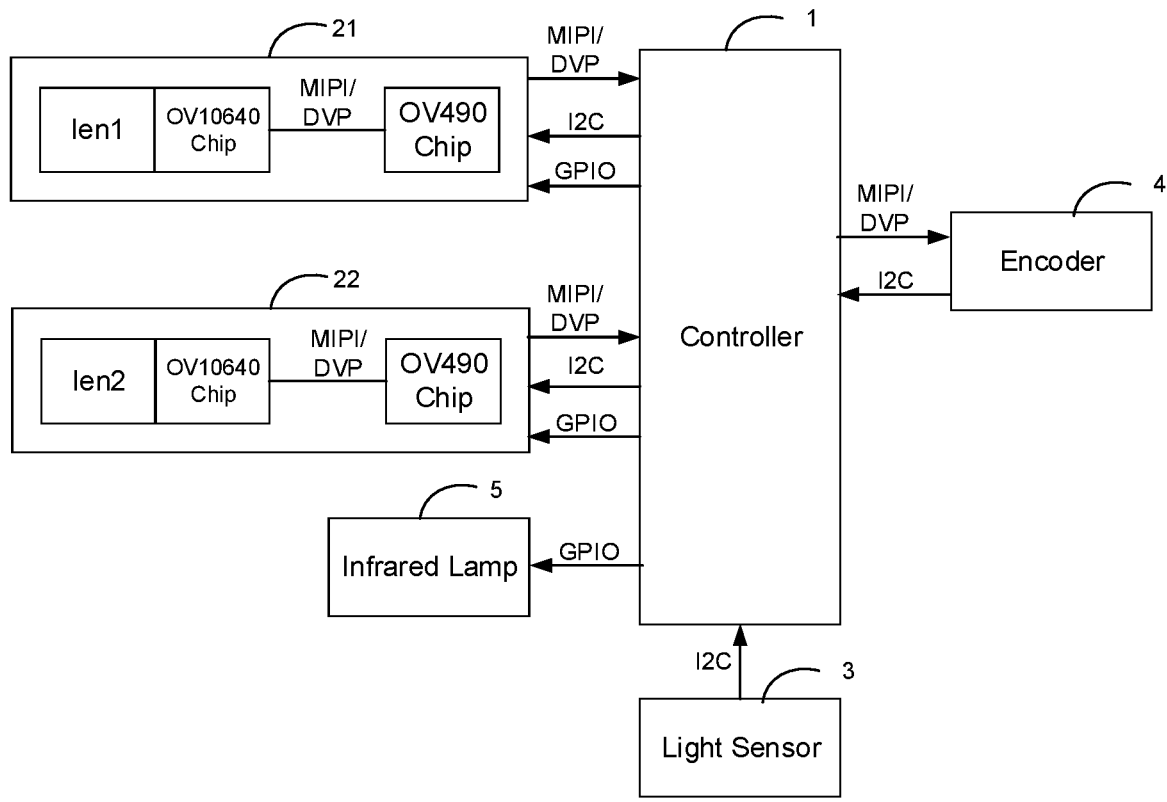
FIG. 4 is another fourth schematic diagram showing a structure of a vehicle side image capturing system according to some embodiments of the present disclosure.

In an example, as shown in FIG. 4, the first camera 21 includes a lens (denoted as len1), an OV10640 chip and an OV490 chip, and the second camera 22 includes a lens (denoted as len2), an OV10640 chip and an OV490 chip. The controller 1 may be a Field-Programmable Gate Array (FPGA). The FPGA may send instructions to the first camera 21 and the second camera 22 via an Inter-Integrated Circuit (I2C) bus and may activate/deactivate the first camera 21, the second camera 22 and the infrared lamp 5 via a General Purpose Input/Output (GPIO) interface. The light sensor 3 may transmit the illumination intensity to the FPGA via the I2C.

Of course, in an embodiment of the present disclosure, the second camera 22 may use an IMX224 chip instead of the OV10640 chip, and a CXD5700 chip instead of the OV490 chip. Of course, in an embodiment of the present disclosure, the photosensitive devices in the first camera 21 and the second camera 22 may be replaced with Charge-Coupled Device (CCD) image sensors. The present disclosure is not limited to any of these details.

In some embodiments of the present disclosure, the controller 1 may receive images captured by the respective cameras via a Mobile Industry Processor Interface (MIPI) or a Digital Video Port (DVP).

Figure 5:
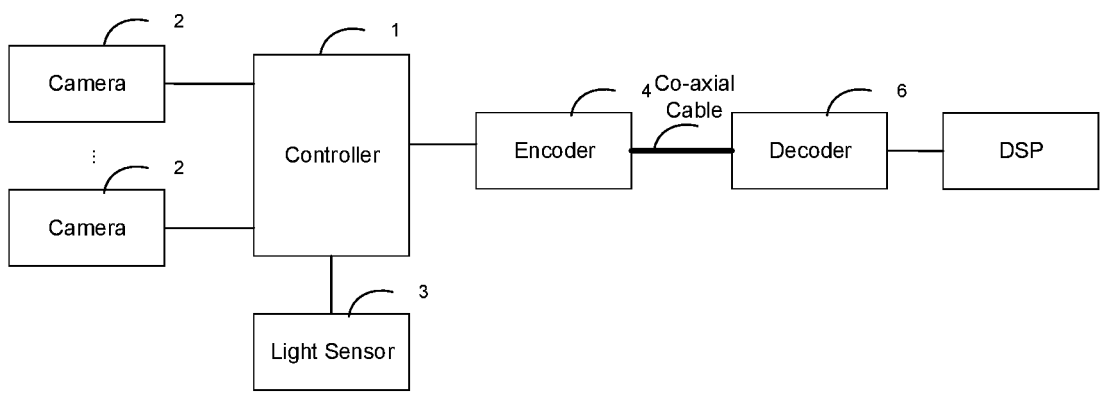
FIG. 5 is another schematic diagram showing a structure of a vehicle side image capturing system according to some embodiments of the present disclosure.
Figure 6:
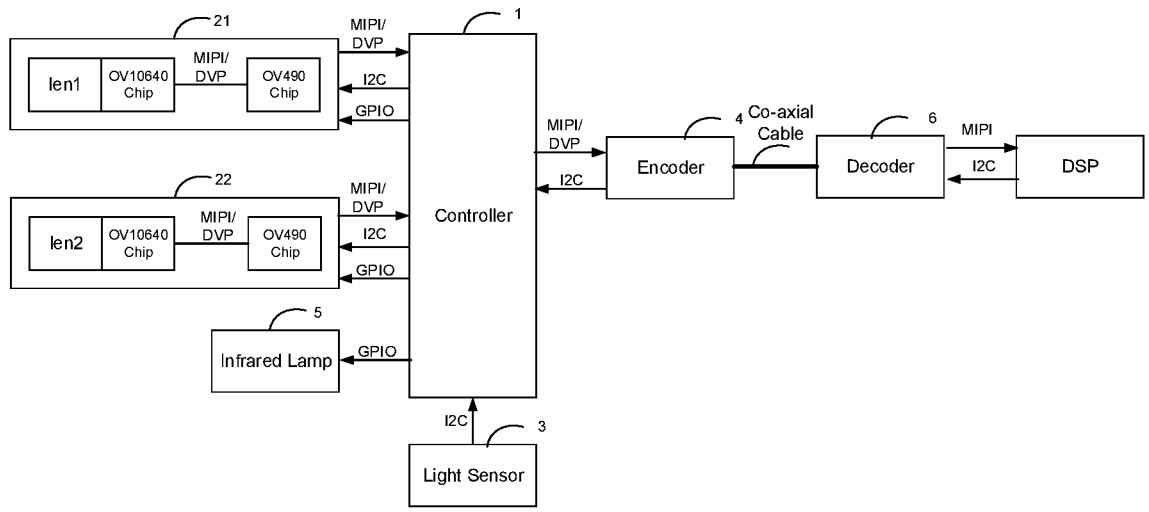
FIG. 6 is another schematic diagram showing a structure of a vehicle side image capturing system according to some embodiments of the present disclosure.

In some embodiments of the present disclosure, the system as described above and shown in FIGS. 1-4 further includes a decoder 6, as shown in FIGS. 5 and 6. The decoder 6 may be connected to the encoder 4 via a coaxial cable and configured to decode the encoded image received from the encoder and transmit the decoded image to a Digital Signal Processor (DSP). In this way, a long distance transmission of the image may be achieved, e.g., the transmission distance may be 15 meters.

In embodiments of the present disclosure, the encoder 4 may use a MAX96705 chip and the decoder 6 may use a MAX9286 chip. The decoder 4 and the controller 1 may transmit images to each other via a DVP or MIPI.

In embodiments of the present disclosure, upon receiving a new capturing task, the controller 1 may need to initialize its connected cameras and light sensor, such that they may function properly. In an embodiment of the present disclosure, the controller 1 may configure parameters of the respective cameras connected. Alternatively, parameters of the respective cameras may be configured via the DSP, e.g., the DSP transmitting configuration parameters of the respective cameras to the decoder 6 via the I2C. In turn, the decoder 6 may transmit the configuration parameters to the encoder 4 via the co-axial cable, then the encoder 4 may transmit the configuration parameters to the controller 1 via the I2C, and finally the controller 1 may transmit the configuration parameters to the respective cameras via the I2C.

Embodiment 2

Figure 7:
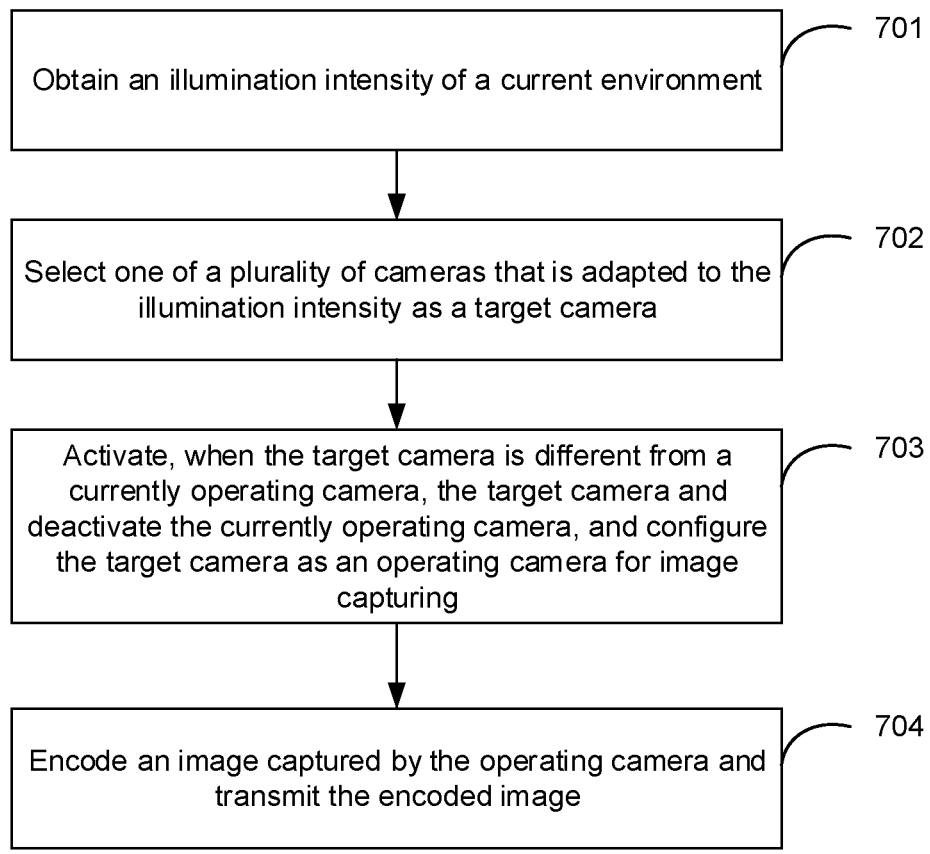
FIG. 7 is a flowchart illustrating a vehicle side image capturing method according to some embodiments of the present disclosure.

Based on the same concept as the vehicle side image capturing system according to the above Embodiment 1, according to Embodiment 2 of the present disclosure, a vehicle side image capturing method is provided. As shown in the flowchart of FIG. 7, the method includes the following steps.

At step 701, an illumination intensity of a current environment is obtained.

At step 702, one of a plurality of cameras that is adapted to the illumination intensity is selected as a target camera.

At step 703, when the target camera is different from a currently operating camera, the target camera is activated and the currently operating camera is deactivated, and the target camera is configured as an operating camera for image capturing.

At step 704, an image captured by the operating camera is encoded and the encoded image is transmitted.

Figure 8:
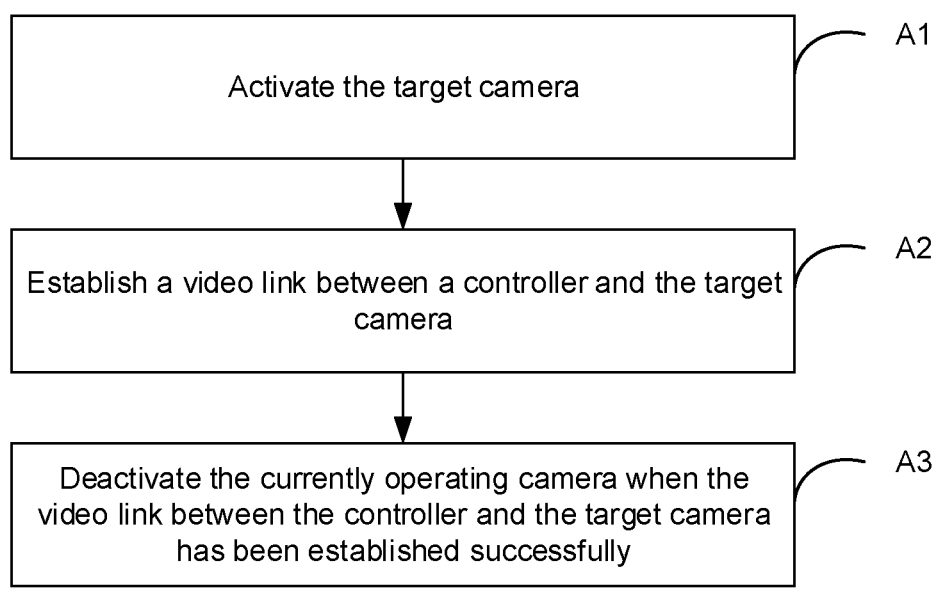
FIG. 8 is a flowchart illustrating a method for activating a target camera and deactivating a currently operating camera according to some embodiments of the present disclosure.

In an example, the step 703 of activating the target camera and deactivating the currently operating camera may include steps A1-A3, as shown in FIG. 8.

At step A1, the target camera is activated.

At step A2, a video link between a controller and the target camera is established.

At step A3, the currently operating camera is deactivated when the video link between the controller and the target camera has been established successfully.

Figure 9:
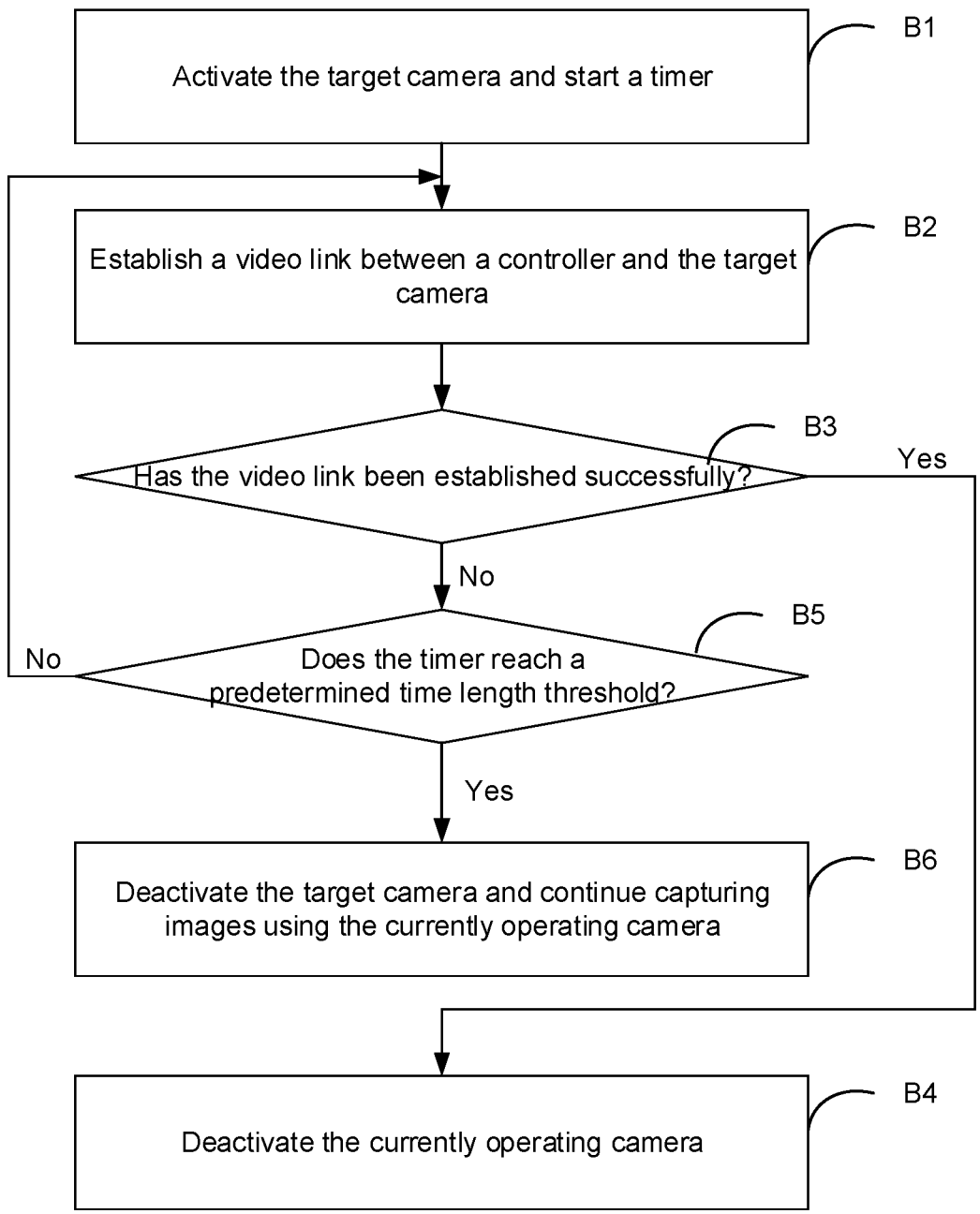
FIG. 9 is another flowchart illustrating a method for activating a target camera and deactivating a currently operating camera according to some embodiments of the present disclosure.

In another example, the step 703 of activating the target camera and deactivating the currently operating camera may include steps B1-B5, as shown in FIG. 9.

At step B1, the target camera is activated and a timer is started.

At step B2, a video link between a controller and the target camera is established.

At step B3, it is determined whether the video link between the controller and the target camera has been established successfully. If so, the process proceeds with step B4; otherwise the process proceeds with step B5.

At step B4, the currently operating camera is deactivated.

At step B5, it is determined whether the timer reaches a predetermined time length threshold. If so, the process proceeds with step B6; otherwise the process proceeds with step B2.

At step B6, the target camera is deactivated and the currently operating camera continues to be used for capturing images.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A vehicle side image capturing system, comprising:
a controller located on a vehicle, a plurality of cameras located on the vehicle, and a light sensor located on the vehicle,
wherein the plurality of cameras and the light sensor are connected to the controller, and
wherein the controller is configured to:
receive an illumination intensity from the light sensor;
select one of the plurality of cameras that is adapted to the illumination intensity as a target camera;
activate, when the target camera is different from a currently operating camera, the target camera;
set a value of a counter to an initial value upon activating the target camera;
establish a video link between the controller and the target camera;
determine whether the video link between the controller and the target camera has been established successfully;
determine whether the counter has reached a predetermined threshold value in response to determining that the video link between the controller and the target camera has not been established successfully;
deactivate the target camera and continue using the currently operating camera in response to determining that the counter has reached the predetermined threshold value;
establish the video link between the controller and the target camera again in response to determining that the counter has not reached the predetermined threshold value; and
increment the counter by an increment value.

2. The system of claim 1, wherein the controller is configured to receive an image captured by the operating camera.

3. The system of claim 1, comprising an encoder located on the vehicle, wherein the encoder is communicatively coupled to the controller.

4. The system of claim 3, wherein the controller is configured to transmit an image captured by the operating camera to the encoder, and wherein the encoder is configured to encode the image captured by the operating camera.

5. The system of claim 3, wherein the controller is configured to transmit images to the encoder via a Mobile Industry Processor Interface (MIPI) or a Digital Video Port (DVP).

6. The system of claim 1, wherein the controller is configured to deactivate the currently operating camera and configure the target camera as an operating camera for image capturing in response to determining that the video link between the controller and the target camera has been established successfully.

7. The system of claim 1, wherein the light sensor is configured to measure, in real time, an illumination intensity related to an environment in which the vehicle is located.

8. The system of claim 1, further comprising a decoder connected to an encoder via a coaxial cable and configured to decode an encoded image received from the encoder and transmit the decoded image to a Digital Signal Processor (DSP).

9. A vehicle side image capturing method, comprising:
receiving, by a controller located on a vehicle, an illumination intensity from a light sensor located on the vehicle;
selecting, by the controller, a camera from a plurality of cameras located on the vehicle that is adapted to the illumination intensity as a target camera;
activating, by the controller, the target camera in response to determining that the target camera is different from a currently operating camera;
setting, by the controller, a value of a counter to an initial value upon activating the target camera;
establishing, by the controller, a video link between the controller and the target camera;
determining, by the controller, whether the video link between the controller and the target camera has been established successfully;
determining, by the controller, whether the counter has reached a predetermined threshold value in response to determining that the video link between the controller and the target camera has not been established successfully;

deactivating, by the controller, the target camera and using the currently operating camera in response to determining that the counter has reached the predetermined threshold value;

establishing, by the controller, the video link between the controller and the target camera again in response to determining that the counter has not reached the predetermined threshold value; and incrementing the counter by an increment value.

10. The method of claim 9, further comprising deactivating, by the controller, the currently operating camera in response to determining that the video link between the controller and the target camera has been established successfully.

11. The method of claim 9, further comprising configuring, by the controller, the target camera as an operating camera for image capturing in response to determining that the video link between the controller and the target camera has been established successfully.

12. The method of claim 9, further comprising encoding an image captured by the operating camera.

13. The method of claim 12, further comprising transmitting an encoded image to a decoder.

14. The method of claim 13, further comprising decoding an encoded image.

15. The method of claim 9, further comprising capturing images using the currently operating camera before the video link between the controller and the target camera is established successfully.

16. The method of claim 9, further comprising determining whether the illumination intensity is higher than or equal to a predetermined illumination intensity threshold.

17. The method of claim 16, further comprising selecting a first camera from the plurality of cameras, wherein the first camera is adapted to an illumination intensity higher than or equal to the predetermined illumination intensity threshold as the target camera in response to determining that the illumination intensity is higher than or equal to the predetermined illumination intensity threshold.

18. The method of claim 16, further comprising selecting a second camera from the plurality of cameras, wherein the second camera is adapted to an illumination intensity lower than the predetermined illumination intensity threshold as the target camera in response to determining that the illumination intensity is lower than the predetermined illumination intensity threshold.

19. The method of claim 18, further comprising activating an infrared lamp before activating the second camera.

20. A non-transient computer-readable storage medium comprising instructions which, when executed by at least one processor, cause the at least one processor to perform operations comprising:

receiving an illumination intensity from a light sensor located on a vehicle;

selecting a camera from a plurality of cameras located on the vehicle that is adapted to the illumination intensity as a target camera;

activating the target camera in response to determining that the target camera is different from a currently operating camera;

setting a value of a counter to an initial value upon activating the target camera;

establishing a video link to the target camera;

determining whether the video link to the target camera has been established successfully;

determining whether the counter has reached a predetermined threshold value in response to determining that the video link has not been established successfully;

deactivating the target camera and using the currently operating camera in response to determining that the counter has reached the predetermined threshold value;

establishing the video link again in response to determining that the counter has not reached the predetermined threshold value; and incrementing the counter by an increment value.

* * * * *